United States Patent Office 3,726,886
Patented Apr. 10, 1973

3,726,886
ADDUCTS OF ALKENYL ISOCYANATES WITH HYDROXYMETHYLATED DIPHENYL OXIDE AND DERIVATIVES THEREOF
James T. K. Woo, Robert M. Nowak, and Dietrich H. Heinert, Midland, Mich., assignors to The Dow Chemical Company, Midland, Mich.
No Drawing. Filed Dec. 7, 1970, Ser. No. 95,882
Int. Cl. C07c 125/06
U.S. Cl. 260—482 B          8 Claims

ABSTRACT OF THE DISCLOSURE

Novel bis(N-alkenylcarbamates) are prepared by reacting (a) vinylisocyanate or isopropenyl isocyanate with (b) a hydroxymethylated diphenyl oxide bearing at least two hydroxymethyl groups or an oxyalkylated and/or a halogenated derivative thereof. These divinyl compounds are useful monomers and cross-linking agents.

BACKGROUND OF THE INVENTION

Vinyl isocyanate has been reacted with dihydroxy compounds, such as alkanediols and dihydric phenols, to produce the corresponding bis(N-vinylcarbamates) having the N-vinylcarbamate groups linked by relatively small divalent radicals. Such prior art compounds have been polymerized by cationic catalysts or by free radical polymerization initiators such as peroxides (benzoyl peroxide, lauroyl peroxide) or γ-irradiation.

Additionally, bis(N-alkenylcarbamates) of Bisphenol A (and Bisphenol A derivatives) were described in our copending United States patent application, Ser. No. 833,714, now U.S. Pat. 3,598,866, filed June 16, 1969.

SUMMARY OF THE INVENTION

Novel compounds have now been discovered which are represented by the formula

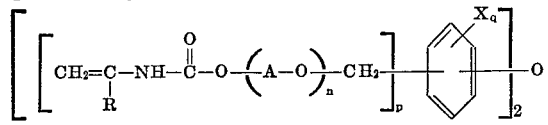

wherein R is hydrogen or methyl (preferably hydrogen); —A— is a vicinal alkylene group of from 2 to 4 carbon atoms; $n$ is an integer of from 0 to about 20 (preferably, 0 to 5); $p$ is 1 or 2; $q$ is an integer of from 0 to 2; and X is chloro or bromo. The compounds vary from crystalline solids to viscous liquids and are useful monomers and cross-linking agents. The relatively large divalent radical which separates the N-vinylcarbamate groups in the subject compounds imparts different and valuable properties to the compounds and to polymers containing the subject compounds.

The subject compounds may be homo- or interpolymerized with other ethylenically unsaturated compounds (such as styrene, ethyl acrylate, methyl methacrylate, polyesters bearing cites of ethylenic unsaturation, etc.) by a number of conventional techniques, e.g. by free radical or γ-irradiation initiated polymerizations. The cross-linked, solid polymers thus formed have many desirable properties (such as solvent resistance) and may be formed into many useful articles.

The novel compounds are conveniently prepared by reacting (a) vinyl isocyanate or isopropenyl isocyanate with (b) a hydroxymethylated diphenyl oxide bearing at least two hydroxymethyl groups or an oxyalkylated and/or a halogenated derivative thereof.

The process is generally conducted in a suitable inert solvent, such as diethyl ether or tetrahydrofuran, at about ambient temperatures. Elevated temperatures may be used to increase the reaction rate, if desired.

Compounds included within (b) above form a well known class which may be represented by the formula

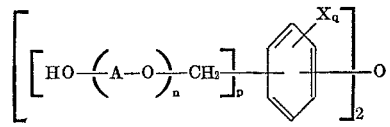

wherein —A—, $n$, $p$, $q$ and X have the aforesaid meanings. Typically, such compounds are prepared by (1) chloromethylating diphenyl oxide (DPO) or a halo derivative thereof (2) hydrolyzing the product from (1) to give the hydroxymethylated DPO and subsequently condensing a lower alkylene oxide, such as ethylene oxide and 1,2-propylene oxide, onto the hydroxymethylated DPO. The ring positions of the hydroxymethyl groups (or oxyalkylated hydroxymethyl groups) vary and are irrelevant for the purpose of this invention.

The molar ratio of (a) to (b) is not critical. However, a stoichiometric amount or an excess of alkenyl isocyanate is preferred, e.g. from 1 to 2 moles of alkenyl isocyanate per hydroxyl equivalent. In many instances, it is advantageous to conduct this reaction in the presence of a condensation catalyst, such as triethylamine, pyridine, diazabicyclooctane (triethylene diamine), dibutyltin dilaurate, stannous octoate, or dibutyltin diacetate.

SPECIFIC EMBODIMENTS

The following examples further illustrate the invention.

Example 1

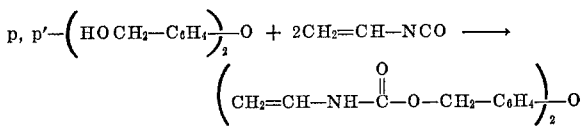

Freshly distilled vinyl isocyanate (17.8 g.; 0.258 mole) was added dropwise to a cooled, stirred solution of bis(hydroxymethyl)diphenyl oxide (23 g., 0.1 mole) in 100 ml. of tetrahydrofuran. An exotherm was observed during addition. After the addition was complete, the reaction mixture was stirred for 1–2 hours at ambient temperature. The solvent was stripped off under reduced pressure leaving 34 g. of product as a slightly yellowish oil. The product structure was confirmed by nuclear magnetic resonance (n.m.r.) and by elemental analysis.

t-Butyl perbenzoate (0.2 g.) was mixed with 20 g. of the above product. The mixture was placed in an aluminum mold (1″ x 3″ x ⅛″) and warmed for 3 days at 80° C. and then for 2 hours at 130° C. A rubbery bar was thus obtained having a flex modulus of 167 p.s.i. (as per ASTM D–790) and a Boyer heat distortion temperature of 28.7 C. (as per ASTM bulletin No. 134, 37 (1945)).

Example 2

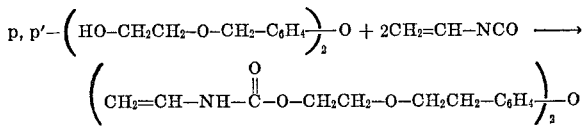

In like manner, vinyl isocyanate (17.8 g.) was reacted with bis(2-hydroxyethoxymethyl)diphenyl oxide (34.3 g., 0.108 mole) in tetrahydrofuran. The product (40 g.) was obtained as a viscous yellowish oil. The product structure was confirmed by n.m.r., infrared and elemental analysis.

A mixture of t-butyl perbenzoate, styrene monomer (16 g.) and 1.5 g. of the product from Example 2 was cured as above. The cured test bars had an average thickness of 0.118″ and a flexural strength of 8,777 p.s.i.; a flexural modulus of 329,000 p.s.i.; as per ASTM D–790.

The following compounds are prepared in like manner.

| Reactants | Products |
|---|---|
| $(HO-CH_2-C_6H_3Cl)_2-O + CH_2=CH-NCO$ | $(CH_2=CH-NH-\overset{O}{\overset{\|}{C}}-O-CH_2-C_6H_3Cl)_2-O$ |
| $(HO-CH_2-C_6H_2Cl_2)_2-O + CH_2=\underset{CH_3}{\overset{\|}{C}}-NCO$ | $(CH_2=\underset{CH_3}{\overset{\|}{C}}-NH-\overset{O}{\overset{\|}{C}}-O-CH_2-C_6H_2Cl_2)_2-O$ |
| $(HO-CH_2-C_6H_3Br)_2-O + CH_2=CH-NCO$ | $(CH_2=CH-NH-\overset{O}{\overset{\|}{C}}-O-CH_2-C_6H_3Br)_2-O$ |
| $[HO(C_2H_4-O)_6-CH_2-C_6H_4]_2-O + CH_2=CH-NCO$ | $[CH_2=CH-NH-\overset{O}{\overset{\|}{C}}-O-(C_2H_4-O)_6-CH_2-C_6H_4]_2-O$ |
| $[HO-(C_2H_4-O)_{12}-CH_2-C_6H_3Cl]_2-O + CH_2=\underset{CH_3}{\overset{\|}{C}}-NCO$ | $[CH_2=\underset{CH_3}{\overset{\|}{C}}-NH-\overset{O}{\overset{\|}{C}}-O-(C_2H_4-O)_{12}-CH_2-C_6H_3Cl]_2-O$ |
| $[HO-(C_3H_7-O)_3-CH_2-C_6H_4]_2-O + CH_2=CH-NCO$ | $[CH_2=CH-NH-\overset{O}{\overset{\|}{C}}-O-(C_3H_7-O)_3-CH_2-C_6H_4]_2-O$ |

Other such compounds are similarly prepared.

We claim:

1. A compound of the formula

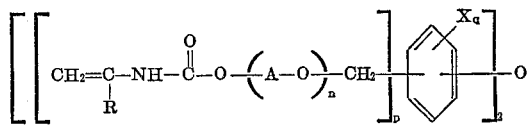

wherein R is hydrogen or methyl; —A— is a vicinal alkylene group of from 2 to 4 carbon atoms; $n$ is an integer of from 0 to 20; $p$ is 1 or 2; $q$ is an integer of from 0 to 2; and X is chloro or bromo.

2. The compound defined by claim 1 wherein R is hydrogen.

3. The compound defined by claim 1 wherein $n$ is from 0 to 5.

4. The compound defined by claim 1 wherein $p$ is 1.

5. The compound defined by claim 1 wherein $q$ is 0.

6. The compound defined by claim 3 wherein $q$ is 0.

7. The compound defined by claim 6 wherein $p$ is 1.

8. The compound defined by claim 7 wherein R is hydrogen.

References Cited

UNITED STATES PATENTS 2,533,189   12/1950   Flory et al.

LORRAINE A. WEINBERGER, Primary Examiner

P. J. KILLOS, Assistant Examiner

U.S. Cl. X.R.

260—78 UA, 613 R

PO-1050
(5/69)

UNITED STATES PATENT OFFICE
CERTIFICATE OF CORRECTION

Patent No. 3,726,886         Dated April 10, 1973

Inventor(s) James T. K. Woo, Robert M. Nowak and Dietrich H. Heinert

It is certified that error appears in the above-identified patent and that said Letters Patent are hereby corrected as shown below:

Col. 2, line 53, delete "28.7 C." and insert ---28.7°C.---.

Col. 2, second line of the formula under Example 2 should read as follows:

--- $(CH_2=CH-NH-\overset{\overset{O}{\|}}{C}-O-CH_2CH_2-O-CH_2-C_6H_4)_2 O$ ---.

Signed and sealed this 16th day of July 1974.

(SEAL)
Attest:

McCOY M. GIBSON, JR.
Attesting Officer

C. MARSHALL DANN
Commissioner of Patents